Nov. 2, 1965    C. A. PRESTON    3,215,296
SELF-LOWERING AUTOMOTIVE FLOATS
Filed April 8, 1964    2 Sheets-Sheet 1
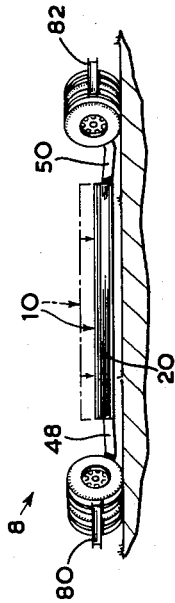
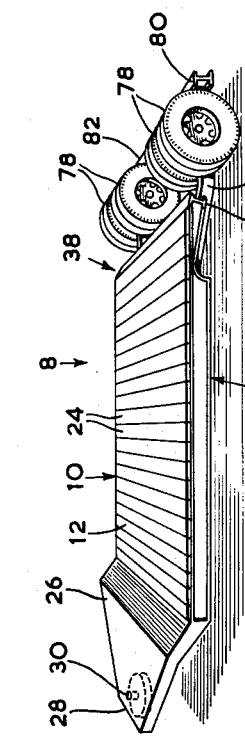
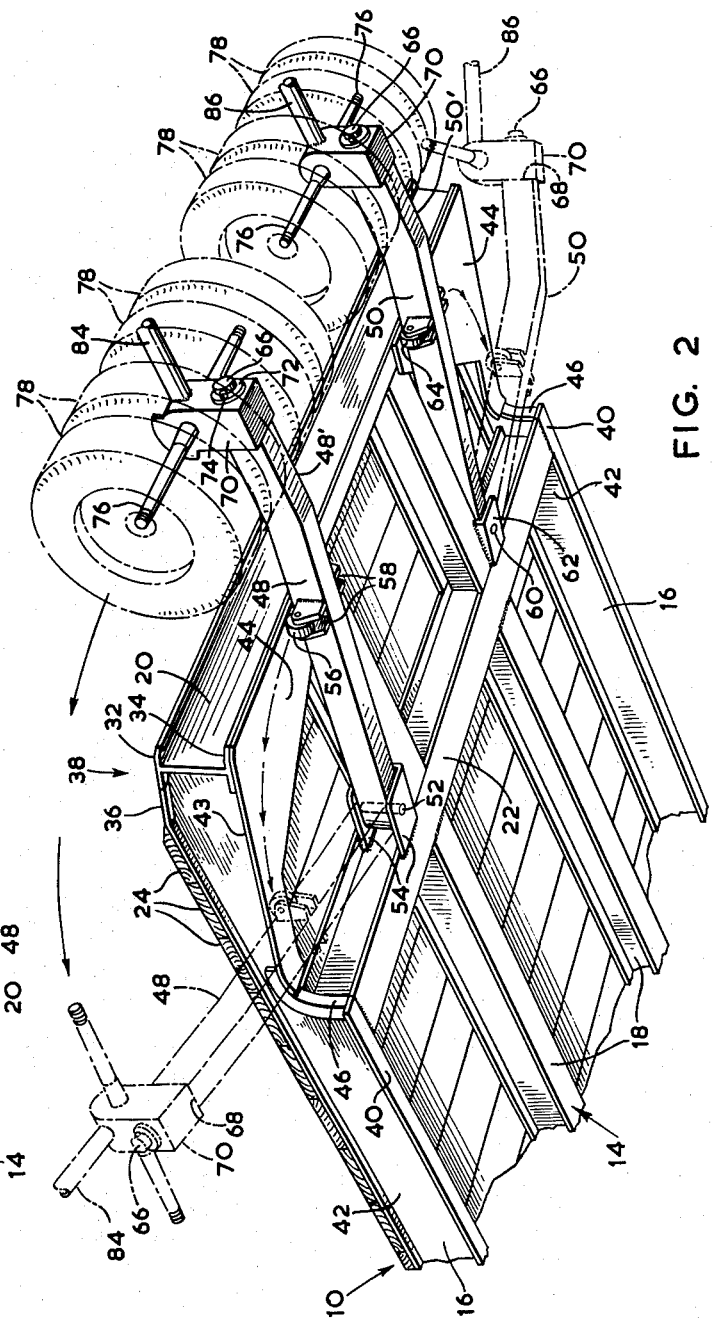
INVENTOR
CLARE A. PRESTON
BY ATTORNEY

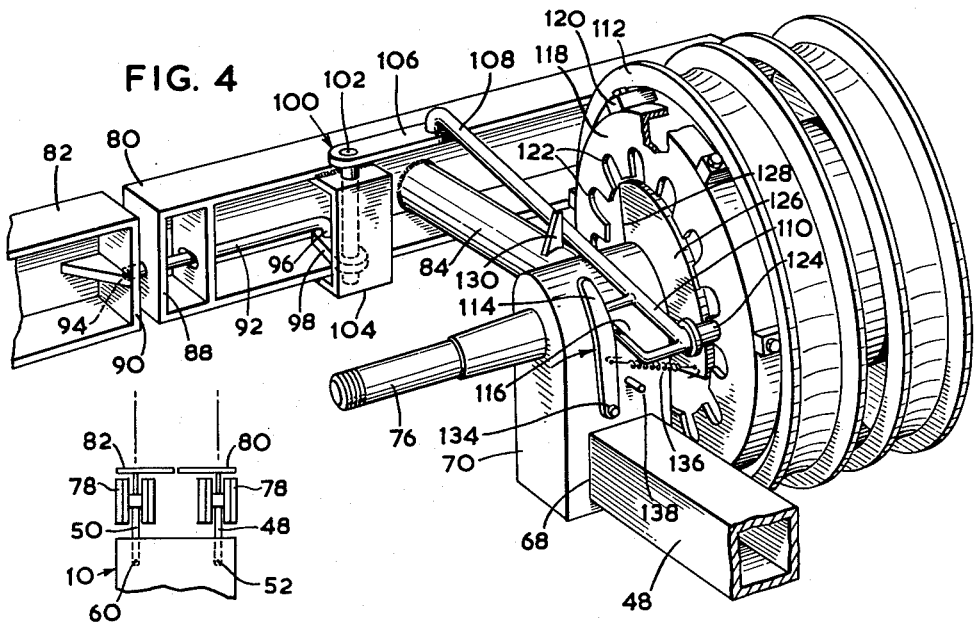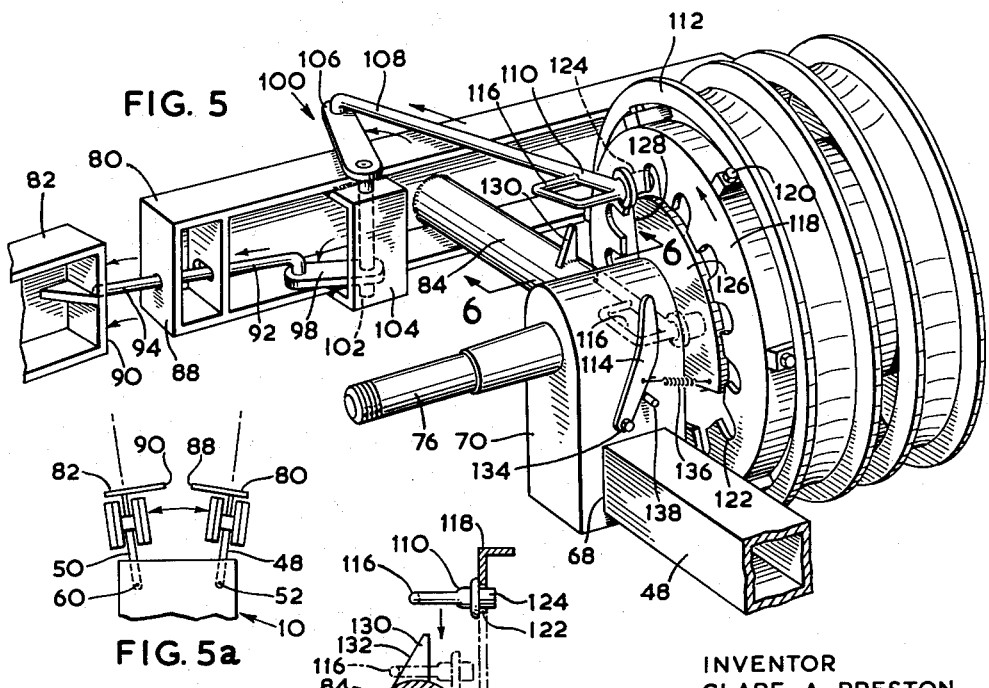

United States Patent Office 3,215,296
Patented Nov. 2, 1965

3,215,296
SELF-LOWERING AUTOMOTIVE FLOATS
Clare A. Preston, R.R. 2, Stouffville, Ontario, Canada
Filed Apr. 8, 1964, Ser. No. 358,242
18 Claims. (Cl. 214—506)

My invention relates to improvements in lowering means for automotive floats of the kind provided with a platform body rearwardly supported by wheel assemblies and connected at the front end by a kingpin with a standard motor trailer tractor by which the float is hauled from place to place for transportation of heavy loads. Floats of this kind usually have low decks in order to reduce to a minimum the distance above ground level that heavy machinery or other objects are required to be elevated in placing them on the float in a loading operation and removing them therefrom in an unloading operation.

According to the teachings of the prior art, trailer bodies of this kind have been provided with lowering means such as wheel suspensions devised so as to lower substantially to the ground at least a portion of the trailer chassis in order to make it easier to load and unload the trailer chassis and also make it immobile against lateral forces which tend to produce undesirable shifting of the trucking vehicle incident to loading and unloading operations. A general object of my invention is to provide a more efficient and serviceable lowering means for automotive floats and particularly to provide a lowering means of the kind referred to having a positive lowering action.

Still another important object of my invention is to provide lowering means for an automotive float incorporated in the wheel assemblies of the float running gear and comprising lateral deflector means for causing companion wheel assemblies to swing outwardly while propelling the automotive float toward a predetermined short distance in a backward direction.

Still a further object of my invention is to provide in a lowering means of this kind a deflector mechanism which is positively actuated by a wheel of one of the suspension units and incorporating automatic disengaging means whereby the deflecting action is terminated automatically when the automotive float has been moved or propelled backwardly a predetermined distance.

Still another and distinctive feature of construction resides in the provision of a manual control whereby the operator of the vehicle may set the deflecting means for carrying out a lowering operation of the float at a desired site.

With these and other objects in view my invention consists in the novel construction and arrangement of the self-actuated lowering means for automotive float as set forth in the ensuing specification and illustrated in the accompanying drawings forming a part thereof.

In the drawings:

FIG. 1 is a general perspective view of an automotive float or trailer truck incorporating the invention;

FIG. 2 is an enlarged perspective view of the rear end of the float viewed from the underside, depicting the lowering means in normal position in solid lines (except for the wheels) and in a second or outer position in phantom lines in which the rear end of the trucking body of the float is lowered, the wheels being omitted in the second or outer position (in phantom) for the sake of clarity;

FIG. 3 is a rear end elevation of FIG. 1 showing how the wheels of the suspension assemblies are spread to bring about the lowering of the automotive float body at its rear end;

FIG. 4 is an enlarged perspective view of one of the rear suspension assemblies omitting the dual wheels at the inner side thereof in order to illustrate more clearly the deflecting means by which the rear wheel assemblies are spread to lower the body of the automotive float, the pusher bar of the deflector means being shown engaged with a wheel ready for initiating a spreading action of the rear wheel assemblies;

FIG. 4a is a diagrammatic top plan view of the rear end portion of the automotive float showing the rear wheel assemblies in normal disposition;

FIG. 5 is a similar perspective view to FIG. 4 but showing how the suspension wheels have the spreading action positively initiated by the deflecting means;

FIG. 5a is a diagrammatic top plan view on a reduced scale similar to FIG. 4a but showing how the wheel assemblies at the rear of the float are moved apart at the early part of the spreading action for the lowering of the chassis or trucking body of the float;

FIG. 6 is a sectional detail on line 6—6 of FIG. 5 showing the pusher bar in the act of being disengaged from the actuating wheel by the upstanding finger cam.

In the selected embodiment of the invention illustrated in the drawings there is generally indicated at 8 an automatic float having a flat trucking body 10 providing a platform for the load which is placed on the floor 12 thereof. The trucking body 10 includes the chassis 14, which includes by way of example but not of limitation, the outer longitudinal structural steel members 16 and the inner longitudinal structural steel members 18 which may be I-beams, for instance. The chassis also includes transverse structural steel members, as is well known in the art, and in the present instant, these include a rear end I-beam member 20 and an inner similar structural steel member 22 spaced from the rear transverse member 20 and disposed parallel thereto—see FIG. 2. The various structural steel members forming the chassis are united in a unitary structure in a manner well known in the art of fabricating structural steel constructions.

The floor 12 is supplied by a suitable deck indicated at 24 for receiving the live load. The front end of the float is conventional in character as indicated at 26 and has the usual upwardly offset end portion 28 supplied with a kingpin coupling 30 by which a connection is made with a standard automotive trailer tractor (not shown) whereby the float is hauled from place to place.

My novel lowering means for the rear end of the float comprises a special construction of the rear end of the chassis 14 as is clearly shown in FIG. 2. The rear end transverse I-beam member 20 is set at an angle to vertical so that its top and bottom flanges 32 and 34 respectively slope rearwardly at a downward angle and are thus positionally joined to the longitudinal members 16 and 18. Preferably the upper flanges of the longitudinal members 16 and 18, as indicated at 36, are also sloped downwardly at their rear extremities planar to the upper flange 32 of the end transverse member 20 in order to provide the deck floor 10 with a downwardly inclined lip generally, denoted at 38, which facilitates passage of objects onto the deck 12 which are required to be transported by the float.

An additional feature is that at each rear corner of the chassis the outer I-beam member 16 has a portion of its lower flange 40 cut away along with a portion of the web 42, the latter being cut away at an upwardly inclined forwardly directed angle co-planar with the lower flange 34 of the rear I-beam member 20. A ramp plate 44 is welded or otherwise secured to the flange 34 of the rear member 20 and to the cut-away portion 43 of the web 42 of the respective I-beam member 16. Bracing elements 46 are welded or otherwise attached to the web 42 of each of the outer I-beams 16 to extend from the lower flange to the ramp plate 44 in order to strengthen the I-beam member at this area. Now, it will be seen that the ramp plates slope upwardly in a general forward direction with respect to the rear portion of the floor 10 and incidentally serve as reinforcing gussets for the rear corners of the chassis. The purpose of these ramp plates will appear shortly.

The suspension wheel assemblies for support of the rear of the float comprise the cantilever arms 48, 50, which extend rearwardly from the transverse chassis member 22 at a downward angle and pass under the rear member 20 and project a short distance therefrom and have the major part of their projecting rear end portions 48' and 50' respectively, disposed in a horizontal plane.

The front end of the arm 48 is pivoted at 52 in upper and lower mounting plates 54 at the outer side of the corresponding longitudinal member 18 and these mounting plates are welded or otherwise secured to the longitudinal member 18 and also to transverse member 22. The pivoting pin 52 is inclined at an angle to the vertical so that it allows the arm 48 to swing outwardly from its normal longitudinal position shown in solid lines in FIG. 2 to the lateral position shown in phantom line and to remain at the same proximity to the ramp plate 44 in any position of its movement. The arm 48 has bearing engagement at the bottom face of the ramp plate 44 through the intermediary of anti-friction elements in the form of rollers 56. The rollers are bracketed at the side of the arm 48 as at 58. Now it will be manifest that the function of the ramp plates 44 is to effect a lowering of the rear end of the float by outward movement of the arms 48, 50, and the wheels thereon. The rollers 56 climb the ramp plate 48 as they travel in an arc of a circle toward the high end of the ramp plate in outward movement of the arm. Conversely the rollers on the arm effect a raising movement of the lower end of the ramp as the arm returns to normal position.

The cantilever arm 50 is similarly mounted by a pivotal pin 60 and upper and lower mounting plates 62 welded or otherwise secured to the inner longitudinal member 18 and transverse member 22 whereby the arm 50 may sweep outwardly across the adjoining ramp plate 44 at that corner of the chassis. Rollers 64 are mounted on opposite sides of the arm to engage the ramp plate in order to sustain the corresponding rear end of the chassis. The arm 50 carries ground wheels similar to those on the arm 48.

Each of the cantilever arms 48 and 50 is provided preferably with two sets of dual wheels 78 and the wheels are mounted on floating axles so that they may have a rocking action for accommodating undulation of a road surface. The mounting of the wheels on the arms 48 and 50 is similar and therefore a description of one mounting means will suffice. The arms are hollow and of a square cross-section. The rear extremity of an arm is reduced to a circular cross-section to provide a pin end 66 forwardly terminating in a shoulder 68 and having turnably mounted thereon a saddle block 70 which is held against end play by end-thrust means such as a washer 72 and cotter pin 74. Aligned stub shafts 76 are secured on the bearing block 70 to extend laterally therefrom above the pin 66. A dual set of the wheels 78 is mounted on each stub axle 76 as shown in the drawings but dual wheels are not essential to the invention.

From the preceding description, it will be manifest that the arrangement provides a floating axle mounting by which the several wheels on each of the cantilever arms 48, 50, may have a rocking action to accommodate undulations of road surface. The road wheels are normally disposed at the rear of the chassis and have the cantilever arm 48, 50, rearwardly extending parallel to each other where they are constrained against unwanted inner movement as by stop means which may be provided on the mounting plates 54 and 62. The suspension wheel assemblies are free, however to move laterally in outward direction and due to the ramp plates and their cooperation with the cantilever arms 48 and 50, there is an inherent tendency for these suspension wheel assemblies to move outwardly when the float is propelled in a backward direction. As the suspension wheel assemblies are caused to move outwardly, the ramps effect the lowering of the rear end of the float and when the wheel suspension assemblies are fully laterally spread, the float is lowered substantially to the ground in a load-receiving or unloading disposition.

It is, of course, highly desirable that the lowering of the float be effected by a propelling movement through a short distance in a backward direction. The structure of the deflecting means for accomplishing or at least initiating the spreading apart of the suspension wheel assemblies for this purpose comprises apparatus which can be manually set by the operator for bringing about a positive spreading action.

The deflecting means which is novel will now be detailed. This comprises a pair of aligned pusher bars 80 and 82 disposed rearwardly of the ground wheels 78 and transversely of the float. Pusher bar 80 is rigidly supported on the cantilever arm 48 by means of a carrier bar 84 rigid therewith and projecting forwardly therefrom with its front end united with the respective saddle block 70. The other pusher bar 82 is rigidly secured to a carrier bar 86 which extends forwardly therefrom and is united with the saddle block 70 of the cantilever arm 50. In the normal positions of the wheel suspension assemblies, the pusher bars 80 and 82 have their inner ends 88 and 90 disposed in close proximity to each other as clearly shown in FIG. 4. Slidably mounted on the pusher bar 80 is a thrust rod 92 which is arranged longitudinally thereof and has an outer end 94 projecting outwardly of the inner end 88 for abutting engagement with the end 90 of the companion pusher bar 82.

The inner end 96 of the thrust rod 92 is pivotally connected to an arm 98 of a bellcrank 100 which is pivotally mounted on the pusher bar 80 by means of a pivot 102 journalled in a bracket 104. The other arm 106 of the bellcrank is pivotally connected at its outer end with an actuator rod 108.

The actuator rod in its normal position projects forwardly to overly and rest upon the saddle block 70 of the arm 48 and is capable of limited up and down movement in addition to a lateral swinging movement to and away from one of the dual wheels 78 at the outer side of the arm 48. It will be noted that in FIGS. 4 and 5 the ground wheels are shown without their tires in order to clarify the structure of the suspension wheel assemblies.

The normal position of the actautor rod 108 is an inactive or neutral position and it is releasably held in such disposition as by an upstanding finger 114. An aperture-forming element 116 is provided on the free end 110 of the actuator rod at the far side of the adjacent wheel in order to receive the upper end of the finger 114 as indicated in phantom line in FIG. 4. To position the actuator rod 108 in this normal or neutral position, it is merely necessary to lower the free end 110 over the finger 114 so that the finger is received in the aperture provided by the element 116. The actuator rod is thus conveniently held in its normal inactive position ready for use. The actuator rod is utilized to impart an outward actuating movement to the thrust bar 92 through the medium of the bellcrank 100 when it is desired to initiate a spreading movement on the part of the wheel supporting assemblies in a backward movement of the float for the lowering thereof. Thrust bar 92, when actuated, makes abutting contact with the end face of the pusher bar 82 to effect the spreading action.

The actuator rod 108 is power operated and the means for accomplishing this comprises a bull-ring 118 secured to the rim 112 of the adjacent wheel at the inner side thereof as by fastening elements indicated at 120. The bull-ring is supplied with a continuous series of notches 122 which are opened to its inner diameter as clearly shown in FIGS. 4 and 5. On the free end 110 of the actuator rod there is provided a pin 124 at the side thereof adjacent to the bull-ring 118 and dimensioned to selectively engage in the notches 122. A stationary retaining plate 126 is employed to keep the pin 124 from dropping out of the engaged notch as the rim 112 rotates rearwardly when the float is propelled backwardly in a lowering operation. The plate 126 is an arcuate member having its periphery conforming to the internal diameter of the bull-gear 118 and is attached to the saddle block 70 of the arm 48. Plate 126 is of a length such that it retains the pin 124 in the engaged notch while the wheel on which the bull-ring is mounted turns through an angle sufficient to thrust the actuator rod 108 rearwardly the distance required to impart an outward working stroke to the thrust bar 92 to initially spread the wheel supporting assemblies in a lowering operation as the float is propelled backwardly. It will be gathered that when the pin 124 is brought into engagement with a notch 122 in the bull-ring 118, the actuator rod 108 is moved rearwardly by reverse rotation of the wheel to which the bull-ring is attached and when the pin passes the rear end 128 of the retaining plate 126, it is no longer held captive in the slot and therefore drops from the bull-ring by gravity as illustrated in FIG. 6. A cam finger 130 upstands from the carrier bar 84 and has an inclined cam face 132 which is engaged by the aperture-forming member 116 as the free end of the actuator rod 110 drops in the disengagement of the pin 124 from the engaged notch. The cam face acts to withdraw the free end 110 clear of the bull-ring and to releasably hold it in the actuated position shown in phantom line in FIG. 6. The operator of the vehicle can then re-set the actuator rod in its normal position by raising its free end clear of the cam finger 130 and shifting it forwardly again to the normal inactive position with the finger 114 received in the aperture-forming member 116.

It may be here remarked that the finger 114 is utilized as a means of engaging the pin 124 in a notch of the bull-ring when it is desired to operate the deflector apparatus. To this end the finger 114 is pivoted at its lower end as at 134 to swing transversely to and away from the bull-ring and is biased toward the bull-ring by a spring 136 which holds it against an abutment 138. Accordingly it will be evident that the finger 114 is normally held in this position which serves to retain the actuator rod in normal disposition of non-use when the aperture-forming member 116 is engaged on the upper end of the finger. To bring about engagement of the pin 124 on the actuator rod with a notch of the bull-ring it is only necessary to lift the end 110 off the finger 114 and to lower it again into engagement with the finger by pulling the finger backward away from the bull-ring so that when released it bears on an outer part of the member 116 to press the end 110 inwardly so that the pin 124 is thus brought into engagement with a notch in the rotation of the bull-ring as depicted in solid lines in FIG. 4.

From this it will be manifest that the invention provides a deflector apparatus in which the operator of the vehicle may manually set the actuator rod 108 for effective operational movement to be motivated by reverse rotation of the bull-ring along with the wheel on which it is mounted, and that the cam finger 130 assures of the positive disengagement of the actuator rod from the bull-ring when a working stroke of the thrust bar 92 has been effected. The deflector apparatus may be manually restored to normal position after an operational movement and can be re-set by the vehicle operator for a further effective operation. A highly important feature of the invention is that it provides a means of possibly initiating the spreading action of the supporting wheel assemblies in a lowering movement of the float as the float is propelled in a backward direction to a predetermined distance.

The advantages and utility of the invention will be obvious from the foregoing disclosure and it will be understood that such changes and modifications may be resorted to as fairly come within the scope of the appended claims.

What I claim is:

1. A self-lowering automotive float comprising a trucking body having a floor and including a chassis, said chassis including outer longitudinal members and a rear transverse member, said longitudinal members having rear ends forming corner junctures with the ends of said rear transverse member, ramp plates at said corner junctures and disposed beneath said rear transverse member and secured thereto, said ramp plates sloping upwardly from said rear transverse member in a general forward direction and secured to said rear ends of said longitudinal member, suspension wheel assemblies for support of the rear end of said trucking body, said suspension wheel assemblies comprising a pair of cantilever arms normally extending longitudinally parallel to each other and having front and rear end, said cantilever arms disposed subjacent said rear transverse member with their rear ends projecting therefrom and said cantilever arms sloping upwardly from said rear transverse members in a general forward direction and having their front ends each pivoted to said chassis on an axis permitting them to swing outwardly laterally of said chassis without changing respective proximity to the corresponding ramp plates, said cantilever arms having bearing contact with the corresponding ramp plates, and road wheels journalled on said cantilever arms, and lateral deflector means for inducing said cantilever arms to swing outwardly in a spreading action while said float is being propelled a predetermined distance in a backward direction, comprising a thrust rod slidably mounted on a said cantilever arm transversely thereof for pushing against a relatively fixed abutment element, and an actuator device engageable with the ground wheel on the last-mentioned cantilever arm for effecting an operational movement of said thrust rod during said backward rotation of said ground wheel.

2. The structure of claim 1, in which said outer longitudinal members have bottom flanges and vertical webs cut away at the rear ends thereof, and in which the cut-away portions of said webs slope upwardly from said rear transverse member in a general forward direction and each have the corresponding ramp plate made fast thereto.

3. The structure of claim 2, wherein said rear transverse member has a bottom flange and is set at an angle to the vertical so that said bottom flange is sloped rearwardly at a downward angle and thus positionally joined to said longitudinal members, and wherein said bottom flange of said rear transverse member is joined to said ramp plates.

4. The structure of claim 3, wherein said rear transverse member has a top flange which is sloped rearwardly at a downward angle to provide a lip for said floor of the truck body.

5. The structure of claim 3, wherein stop means is supplied on the chassis to limit inward movement of said cantilever arms.

6. The structure of claim 3, wherein the front ends of said cantilever arms are severally pivoted on an axis to the vertical such that constant bearing contact with the corresponding ramp plate is maintained in the swinging movements of said cantilever arms.

7. The structure of claim 3, wherein antifriction rollers are employed on said cantilever arms for bearing contact with the ramp plates respectively.

8. The structure of claim 3, in which said suspension wheel assemblies include at least two ground wheels on each cantilever arm, and in which the ground wheels of each cantilever arm are mounted as a rockable unit to accommodate road-surface undulations.

9. In a self-lowering automotive float or the like having a chassis supported by suspension wheel assemblies including companion cantilever arms mounted on ground wheels and pivoted to swing outwardly of said chassis with an attendant lowering movement thereof; lateral deflector means for inducing said suspension wheel assemblies to swing outwardly in a spreading action while propelling said float a predetermined distance in a backward direction, comprising a thrust rod slidably mounted on a said cantilever arm transversely thereof for pushing against a relatively fixed abutment element, and an actuator device engageable with a ground wheel on the said cantilever arm for effecting an operational movement of said thrust rod during backward rotation of said ground wheel.

10. In a self-lowering automotive float or the like having a chassis supported by suspension wheel assemblies including companion cantilever arms mounted on ground wheels and pivoted to swing outwardly of said chassis with an attendant lowering movement thereof; lateral deflector means for inducing said suspension wheel assemblies to swing outwardly in a spreading action while propelling said float a predetermined distance in a backward direction, comprising a thrust rod slidably mounted on one of said cantilever arms transversely thereof for pushing against an abutment on the other cantilever arm, and an actuator device carried by one of said cantilever arms and engageable with a ground wheel thereof for effecting an operational movement of said thrust rod during backward rotation of said ground wheels.

11. The structure of claim 10, in which a pusher bar supports said thrust rod and is fixed on the said one of the cantilever arms, and in which a pusher bar provides said abutment on the said other cantilever arm.

12. The structure of claim 11, said pusher bars disposed rearwardly of said ground wheels and having inner ends, one of said inner ends having said thrust rod projecting therefrom for abutting engagement with the other inner end.

13. The structure of claim 11, said pusher bars fixed on the respective cantilever arms by means of carrier bars, and said ground wheels mounted on the respective cantilever arms by means of saddle blocks which are rockable for accommodating road surface undulations.

14. In a self-lowering automotive float or the like having a chassis supported by suspension wheel assemblies including companion cantilever arms mounted on ground wheels and pivoted to swing outwardly of said chassis with an attendant lowering movement thereof; lateral deflector means for inducing said suspension wheel assemblies to swing outwardly in a spreading action while propelling said float a predetermined distance in a backward direction, comprising a thrust element mounted on a said cantilever arm for exerting a pushing movement against a fixed abutment element, and an actuator device engageable with a ground wheel on said cantilever arm for effecting an operational movement of said thrust element during backward rotation of said ground wheel, said actuator device including an actuator rod, and motion translating means forming a connection between said thrust element and said actuator rod.

15. In a self-lowering automotive float or the like having a chassis supported by suspension wheel assemblies including companion cantilever arms mounted on ground wheels and pivoted to swing outwardly of said chassis with an attendant lowering movement thereof; lateral deflector means for inducing said suspension wheel assemblies to swing outwardly in a spreading action while propelling said float a predetermined distance in a backward direction, comprising a thrust rod slidably mounted on a said cantilever arm for exerting a pushing movement against a relatively fixed abutment element, an actuator rod supported on said cantilever arm and capable of endwise movement, bellcrank means connecting said actuator rod to said thrust rod, a pin on said actuator rod, a bull ring on a ground wheel of said cantilever arm and having a circular series of notches for selective engagement by said pin, means by which said actuator rod is laterally shiftable to engage said pin in one of said series of notches, and disengagement means for withdrawing said pin from the engaged notch at a predetermined point in the backward rotation of said bull ring due to reverse motion of the ground wheel to which it is attached.

16. In a self-lowering automotive float or the like having a chassis supported by suspension wheel assemblies including companion cantilever arms mounted on ground wheels and pivoted to swing outwardly of said chassis with an attendant lowering movement thereof; lateral deflector means for inducing said suspension wheel assemblies to swing outwardly in a spreading action while propelling said float a predetermined distance in a backward direction, comprising a thrust rod slidably mounted on a said cantilever arm for exerting a pushing movement against a relatively fixed abutment element, an actuator rod supported on said cantilever arm and capable of endwise movement, means connecting said actuator rod to said thrust rod for translating a first movement of said actuator rod in an endwise direction into an effective thrust movement of said thrust rod, a laterally extending pin on said actuator rod, and motivating means on a ground wheel of said cantilever arm engageable by said pin for imparting a first movement to said actuator rod when the ground wheel rotates backwardly.

17. A structure as set forth in claim 11, in which a cam device withdraws said pin from engagement with said motivating means at a predetermined point in the backward rotation of said ground wheel.

18. A structure as set forth in claim 16, in which a camming finger serves to engage said pin with said motivating means.

References Cited by the Examiner
UNITED STATES PATENTS

| | | | |
|---|---|---|---|
| 2,431,388 | 11/47 | Fitzpatrick | 280—43.11 |
| 2,513,855 | 7/50 | Fogwell | 214—506 |
| 2,757,936 | 8/56 | McCavey et al. | 280—43.11 |
| 2,861,811 | 11/58 | Lassen | 214—506 X |
| 3,000,523 | 9/61 | Nicolas | 214—505 |

GERALD M. FORLENZA, *Primary Examiner.*